(12) United States Patent
Kelley

(10) Patent No.: US 6,279,244 B1
(45) Date of Patent: Aug. 28, 2001

(54) FANCY SIZERS

(76) Inventor: George Thomas Kelley, 3176 Ferns Glenn Dr., Tallahassee, FL (US) 32308

(*) Notice: Subject to any disclaimer, the term of this patent is extended or adjusted under 35 U.S.C. 154(b) by 0 days.

(21) Appl. No.: 09/280,022

(22) Filed: Mar. 29, 1999

(51) Int. Cl.[7] .................................. A61B 5/11; A44C 9/00
(52) U.S. Cl. .......................... 33/514.1; 33/512; 33/555.1; 63/15
(58) Field of Search ............................ 33/514.1, 512, 33/501.45, 501.08, 555.1, 555.2, 555.4; 63/15; D10/64

(56) References Cited

U.S. PATENT DOCUMENTS

| | | | | |
|---|---|---|---|---|
| 146,974 | * | 2/1874 | Allen | 33/514.1 |
| D. 189,763 | * | 2/1961 | Solomon | D10/64 |
| D. 304,976 | * | 12/1989 | Grossiord | D3/207 |
| 524,589 | * | 8/1894 | Gruebel | 33/514.1 |
| 605,584 | * | 6/1898 | Muffly | 70/456 R |
| 803,839 | * | 11/1905 | Merrill | 70/459 |
| 1,172,374 | * | 2/1916 | Leimer | 70/459 |
| 1,176,025 | * | 3/1916 | Bolhim | 24/13 |
| 1,213,607 | * | 1/1917 | Engelsman | 33/514.1 |
| 1,442,985 | * | 1/1923 | Toy | 33/514.1 |
| 2,873,586 | | 2/1959 | Krandall . | |
| 2,962,796 | | 12/1960 | Bick . | |
| 3,548,506 | * | 12/1970 | Harrington | 33/555.2 |
| 3,590,598 | * | 7/1971 | Leone | 63/15.6 |
| 4,133,195 | * | 1/1979 | McLaren | 70/456 R |
| 4,245,485 | * | 1/1981 | Bushong | 63/15.6 |
| 4,903,507 | * | 2/1990 | Gesensway | 63/15.6 |
| 4,916,924 | | 4/1990 | Borgenicht . | |
| 5,261,256 | * | 11/1993 | Ellenbecker et al. | 63/15.6 |
| 5,269,069 | * | 12/1993 | Min | 33/514.1 |
| 5,619,875 | * | 4/1997 | Lahaussois | 70/457 |
| 5,628,208 | * | 5/1997 | Rood | 63/15.6 |
| 5,636,531 | * | 6/1997 | Miller | 63/15.6 |
| 6,003,334 | * | 12/1999 | Miller | 63/15.5 |

FOREIGN PATENT DOCUMENTS

2315981 * 2/1998 (GB) .

* cited by examiner

*Primary Examiner*—Diego Gutierrez
*Assistant Examiner*—Lydia M. De Jesús
(74) *Attorney, Agent, or Firm*—Carnes Cona Dixon

(57) ABSTRACT

The present invention is a demonstration set for sizing rings to an individual and to provide a solution to rings which can pass the wearer's knuckle, but rotates easily when secured to the finger. The demonstration set includes a holding apparatus having at least two sets of gauges. Each gauge includes a plurality of rings in various and the rings increase in incremental sizes. An attaching device is secured to each ring of each set of gauges for enabling the ring to be removably and slideably secured to the holding device. A ring guard-type item is secured to each ring of at least one set of gauges.

17 Claims, 2 Drawing Sheets

FANCY SIZERS

BACKGROUND OF THE INVENTION

1. Field of the Invention

The present invention relates generally to a ring sizing apparatus and more particularly to a ring sizing apparatus which includes a plurality of options for the consumer for adequately and efficiently sizing a ring to an individual's finger, regardless of the size and girth of the wearer's knuckles. The use of the present invention will inherently illustrate solutions to the above-mentioned problem, by providing a system which offer additional options to ultimately provide for a ring which is comfortable to wear and that does not permit the ring to slide and rotate around the finger, while providing a item which is economically feasible.

2. Description of the Prior Art

Rings have been worn for centuries and for years wearers have been complaining about how their ring is not a perfect fit, and though it fits over the knuckle area comfortably, once in place, it tends to move and rotate, producing an uncomfortable and annoying situation. Methods and systems used for sizing a ring to a particular individual, unfortunately, have not changed nor improved in time. As such, the ring is sized to the individual via conventional a method, and such methods is disclosed in U.S. Pat. No. 2,962,796 issued to Bick. As is conventionally used and as disclosed in Bick, sizing occurs by the use of a set of finger gauges. The set generally contains ring gauges from size one, which is the smallest diameter, to the size fifteen, the largest diameter. The rings alter in the set via one-half incremental size.

In order to use this conventional method, which is still practiced today, the user uses one ring gauge at a time, by placing a particular ring gauge on his finger, removing the particular ring gauge, and replacing with an alternative size. This process is continued until the wearer determines the most comfortable fitting ring size. Though somewhat efficient, this process does suffer some shortcomings, by not taking into consideration the user's knuckle size, which can vary greatly from individual to individual. A ring gauge that can fit over one's knuckle is by no way a guarantee that the ring will fit comfortably on the finger when in placed. The possibility of the ring rotating, twirling and swirling about the finger is a great probable, since one's knuckle's is generally larger in size in comparison to the lower section of one's finger. Enlarged knuckles are common and at time is due to arthritis, injury, or natural growth.

Hence, what is needed is an apparatus that will adequately and effectively size a finger, while taking into consideration the wearer's knuckle size. This product should be an apparatus that offers solutions as well as accurate measurements for properly and adequately sizing an individuals finger. This will ensure a comfortable and non-annoying fit. Such an apparatus should be versatile, simple in construction so as to provide a device that is successful in use and that can be used with a minimal amount of training.

Accordingly, it is seen that none of these previous efforts provide the benefits intended with the present invention, such as identified above. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a sizing apparatus enabling options that are viewed both visually and physically for users who desire a ring which can fit around their knuckle, yet be snug around their finger, once the ring is located thereon. Due to the imperfections of one's hand, the knuckle may be larger in girth than the area where the ring is worn on the finger. This apparatus addresses this concern, and as such, the present invention is a demonstration set of sizing options for an individual. The sizing options will come in a plurality of sizes as is conventional and well known in the industry.

The ring sizing apparatus comprises two embodiments. In the first embodiment of the ring sizing apparatus will include at least two sets of gauges. Each set includes a plurality of ring gauges, preferably from size one to size fifteen, and wherein the gauges increase in incremental one-half sizes.

Each set of gauges include a different configuration which is adaptable to the wearer and which offers a solution to a potential problem, due to the structure of one's hand. In one set, or the first set, of the first embodiment, the gauges will be constructed conventionally. Hence, the gauges will include a plurality of circular shaped rings, used as in conventional methods. This will determine the ring size of the user.

A second set, and each subsequent set, if provided, will include a solution to a potential problem, by offering a means of securing the ring around the finger without causing the ring to rotate. This will ultimately provide for a comfortable fit. This set, and each subsequent set, if provided, will include circular shaped rings having a guard-type item located within or on the circular ring. This guard-type item will be internally or externally located so as to decrease the circumference of the ring once attached to the finger. This guard will be any conventional type guard which is commercially available, or optionally, can be any guard which has been patented or described in a printed publication. The use of such an item will provide the user with the option of feeling how the guard-type item will feel once attached. In addition, knowing the price of such an item, will also assist in determining if the item is desirable by the user. This guard-type item which can be used for each set, include, but is not limited to, spring loaded clips, internal gripping fingers, adjustable sliding ring shanks, pivotal type ring guards, solid nubs (solid protrusions located within the ring), or the like.

In the second embodiment of the present invention, the ring sizing apparatus will include at least two sets of gauges. Each set includes a plurality of ring gauges, preferably from size one to size fifteen, and wherein the gauges increase in incremental one-half sizes.

Each set of gauges includes a different configuration for a ring guard-type item. This second embodiment eliminates the set for sizing a finger, since most jewelers and the like, have one at hand. This second embodiment is geared solely to a means of correcting and solving a problem by offering the consumer a visual, and more importantly, a physical means of trying on the particular guard-type item for determining which is the best suited for the wearer's finger. Accordingly, each set in the second embodiment will include circular shaped rings having a guard-type item located within the circular ring. This guard type item will be internally located so as to decrease the circumference of the ring once attached to the finger. This guard will be any conventional type guard that is commercially available, or optionally, can be any guard which has been patented or described in a printed publication. This guard-type item can be, but not be limited to conventional ring guard-type items having the following configuration: spring loaded clips, internal gripping fingers, adjustable sliding ring shanks, pivotal type ring guards, solid nubs (solid protrusions located within the ring), or the like.

In order to comfortably and conveniently transport the ring sizer apparatus, a carrying means is utilized. This carrying means includes an elongated shaft substantially shape rectangularly. The shaft maintains the sets of gauges. A side of the rectangularly shaped shaft include an entering and existing means for enabling the particular ring gauge of a particular set to be removed easily and quickly. When removing or replacing a gauge an existing means will be exposed and when in the storing stage, this existing means will be covered, so as to prevent removal. This will permit easy accessibility to the set, as well as visibility of each type of option, so as to provide a system that is user friendly to both the consumer and user, generally, the jeweler.

Accordingly, it is the object of the present invention to provide for a ring sizing apparatus which will overcome the deficiencies, shortcomings, and drawbacks of prior ring sizing apparatus and methods thereof.

Another object of the present invention is to provide for a ring sizing apparatus which address the concerns and options available to the consumer prior to or simultaneously with the purchase of the ring and regardless of the wearer knuckle size.

Still another object of the present invention, to be specifically enumerated herein, is to provide a ring sizing apparatus in accordance with the preceding objects and which will conform to conventional forms of manufacture, be of simple construction and easy to use so as to provide a device that would be economically feasible, long lasting and relatively trouble free in operation.

Although there have been inventions related to ring sizing apparatus, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
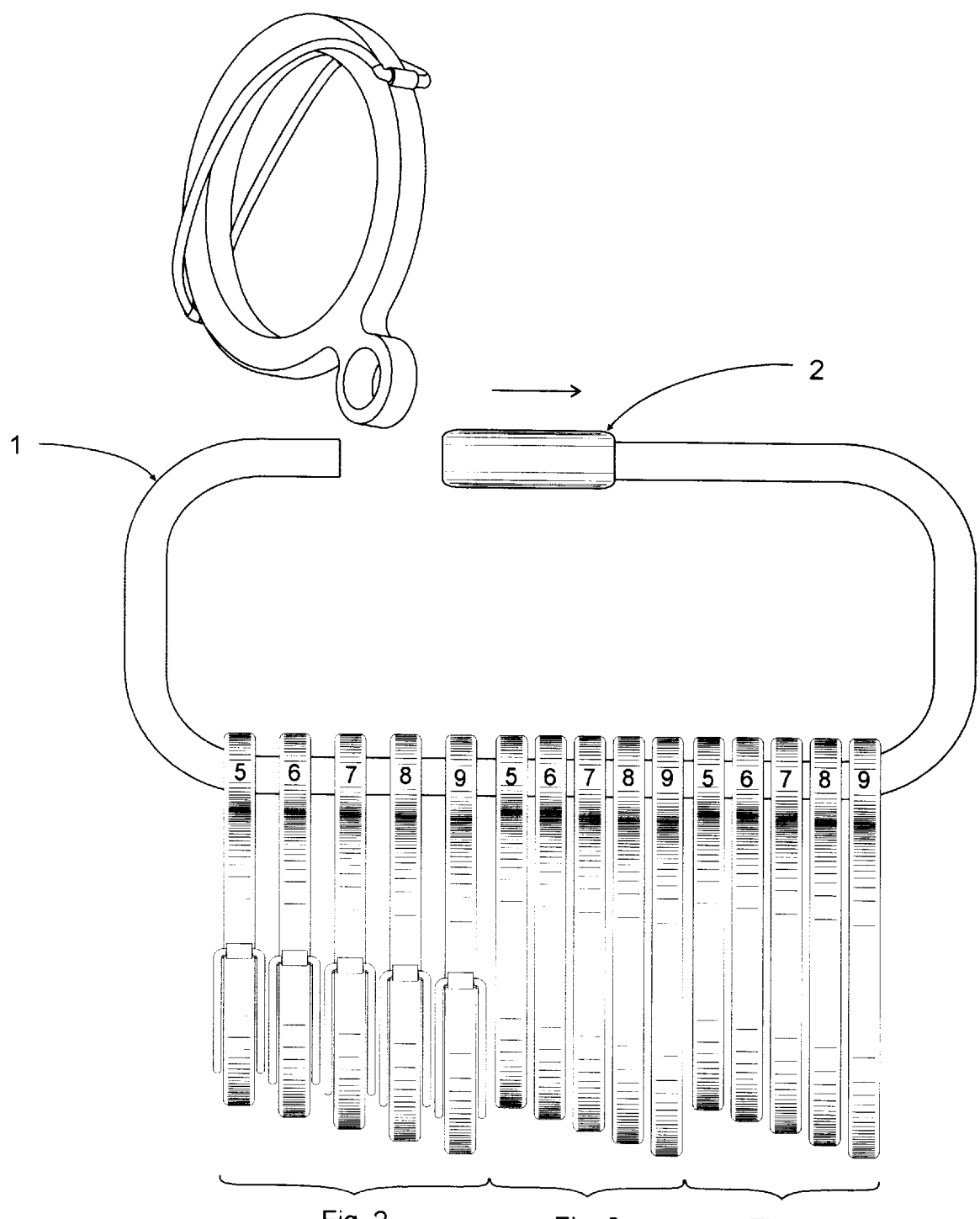
FIG. 1 is a side planar view of ring sizing apparatus of the present invention.

As seen in the drawings, in particular to FIG. 1, there is shown the present invention, a ring sizing apparatus, also known as a fancy sizer, and denoted by reference numeral 10. This ring sizing apparatus 10 is an apparatus designed and configured to offer a means of accurately and adequately fitting a ring on an individual's finger, regardless of the size and girth the wearer's knuckle or finger. Accordingly, the present invention is a demonstration set of sizing options for an individual, wherein the individual can physically feel and try the various options that are available which will address the concerns of the consumer. Physically trying on the various options is an immeasurable service for the consumer that offer solutions to well-known frustrating problems. Having the options available will inherently allow the consumer to make an educated decision, taking into account both the feel and costs of having an option and comparing it to not having the option secured to the ring in question.

As seen in FIG. 1, the apparatus of the present invention 10 comprises a demonstration set having at least two sets of gauges 12a, 12b, and 12c. It is noted that FIG. 1 illustrates an example of one option for the ring sizing apparatus of the present invention; however, is to be understood that this number of gauges can be increased or decreased as deemed necessary for any particular environment and as deemed necessary by the user, generally the jeweler.

Each set, as seen in this figure, 12a, 12b, and 12c, includes a plurality of ring gauges. In the preferred embodiment, the ring gauges will be from size one to size fifteen, and wherein the gauges increase in incremental one-half sizes. The gauges of each set will further include an attaching device 14, for attaching the ring gauge to a holding apparatus 16. This attaching device 14 will enable quick and efficient removal to and from the holding apparatus. In addition, this attaching device will enable each gauge to be visual and accessible even when attached to the holding apparatus 16.

As seen in FIGS. 1–4, the attaching device 14 is a circular hoop that is slidably and removably secured to the holding apparatus 16. This hoop will allow for the demonstrator, generally the jeweler, to move and slide the other gauges aside for viewing and illustrating a particular ring gauge of a particular set. Once viewed, it can be determine if the wearer, generally the consumer, wishes to physically try the item on outside the holding apparatus. In this instance, the gauges are slid so as to allow for the particular ring of the particular set to be in proximity of an exit/entrance element 32, as shown in FIG. 1, of the holding apparatus 16. Once in the proximity, the exit/entrance element 32 is activated for removal of the particular item. It is noted that this exit/entrance element 32 will be discussed in further detail in the subsequent paragraphs of the application, after the discussions of the various configurations of the gauges that are to be used with the apparatus of the present invention.

In one embodiment of the present invention, at least one set of gauges will be circular rings. The rings will be conventional and will be used to determine the approximate size of the wearer's finger.

Figure 2:
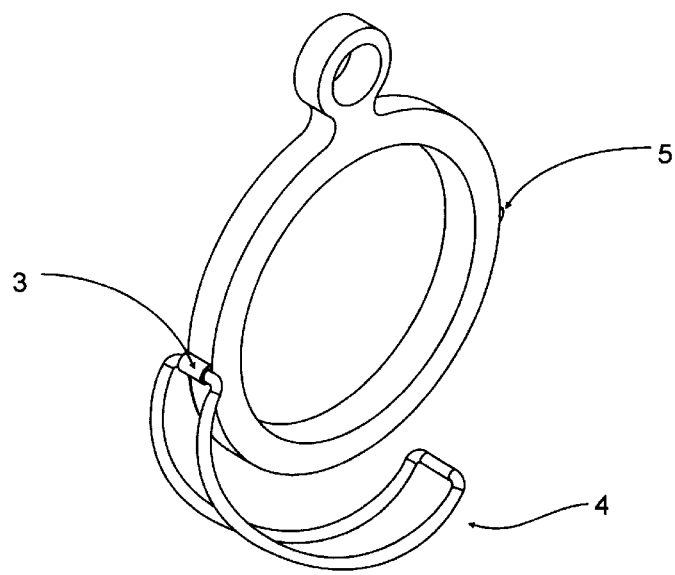
FIG. 2 is a perspective view of an example of the ring-type guard that can be used with the ring sizing apparatus of the present invention.
Figure 3:
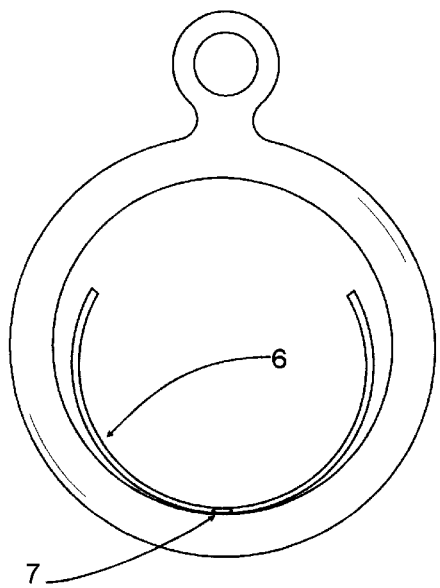
FIG. 3 is a front view of another example of the ring-type guard that can be used with the ring sizing apparatus of the present invention.

Each subsequent set of gauges will be circular rings having a guard-type item 18 located within or on each circular ring. This guard-type item 18 will be either internally or externally located on the ring so as to decrease the circumference of the ring once attached to the finger, ultimately providing a comfortable fit for the wearer. This guard-type item 18 will be any conventional type guard which is commercially available, or optionally, can be any guard which has been patented or described in a printed publication. A few of the guard-type items that have been used to produce favorable results are illustrated in FIGS. 2–3. As seen in these figures, a few examples of the guard-type items 18*a* that can be use are illustrated. As seen in FIG. 2, the first example of the guard-type item can be a pivotal type ring guard. This particular pivotal type ring guard includes a substantially semi-circular portion 20. This portion 20 includes a first end pivotally secured via point 22 to the exterior of the ring. Located opposite from the point 22 is a catch 24 for catching and securing portion 20 to the ring. To utilize this guard-type item, the user removes the second end of portion 20 from the catch. Once removed, the ring is slip on the finger. The second end is then secured to the catch 24 for consequently providing a snug and comfortable fit to the wearer.

Another example of a guard-type item that can be used is illustrated in FIG. 3. As seen in this figure this guard-type item 18*b* comprises a flexible and resilient crescent member 26 that is centrally secured to the ring via central point 28. In operation, this guard-type item will expand when place over an enlarge area, such as the knuckle, yet will retract to its original shape after passage. This will ultimately provide for an easy and comfortable means for attaching and removing the ring to one's finger. Once one, the crescent member will provide a snug and comfortable fit to the wearer.

Figure 4:
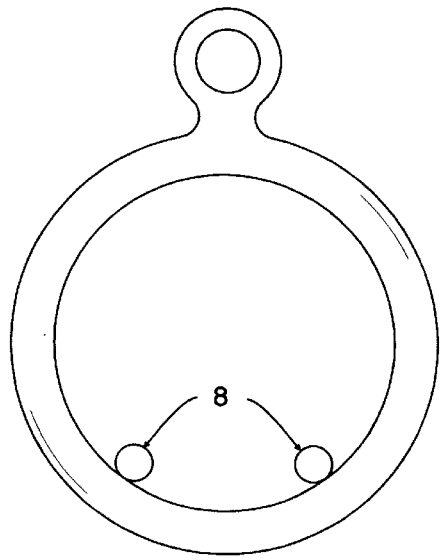
FIG. 4 is a front view yet another example of the ring-type guard that can be used with the ring sizing apparatus of the present invention.

Still another example of a ring guard-type item that can be used is further illustrated in FIG. 4. As seen this ring guard-type item 18*c* is basically a pair of nubs, also known as stabilizers 30. These nubs or stabilizers are protrusions, either solid or hollow, which decrease the circumference of the ring and provide a comfortable fit when worn.

Other ring guard-type items that can be used, and not illustrated include, but are not limited to: internal gripping fingers, adjustable sliding ring shanks, or the like.

In the second embodiment of the present invention, like the first embodiment, the ring sizing apparatus will include at least two sets of gauges 12*a*, 12*b*, and 12*c*. Each set includes a plurality of ring gauges, preferably from size one to size fifteen, and wherein the gauges increase in incremental one-half sizes. The gauges of each set will further include an attaching device 14, for attaching the ring gauge to a holding apparatus 16. This attaching device 14 will enable quick and efficient removal to and from the holding apparatus. In addition, this attaching device will enable each gauge to be visual and accessible even when attached to the holding apparatus 16. This attaching device 14 is substantially identical in shape, size and operation as discussed with the first embodiment, and thus will not be disclosed in further detail.

In the second embodiment, the hollow rings used to size an individual's finger is eliminated. Hence, this second embodiment is geared solely towards a means of address the concerns of a consumer, particularly, loose fitting rings. Accordingly, each set of gauges includes a different configuration for a ring guard-type item. Accordingly, each set in the second embodiment will include circular shaped rings having a guard-type item located within the circular ring. This guard type item will be internally or externally located so as to decrease the circumference of the ring once attached to the finger. This guard will be any conventional type guard that is commercially available, or optionally, can be any guard which has been patented or described in a printed publication. This guard-type item can be, but not be limited to conventional ring guard-type items having the following configuration: pivotal type ring guards (as discussed and disclosed in FIG. 2, also known as a hinge guard), spring loaded clips (as discussed and disclosed in FIG. 3, also known as a horseshoe guard), solid or hollow nubs (as discussed in disclosed in FIG. 4, also known as stabilizers), internal gripping fingers, adjustable sliding ring shanks, or the like.

In order to comfortably and conveniently transport the ring sizer apparatus, a carrying means or holding apparatus 16, illustrated in FIG. 1, is utilized. This carrying means or holding apparatus includes an elongated shaft member 38 substantially shape rectangularly. The shaft 38 maintains the sets of gauges. The shaft member 38 includes opposite ends that face one another, yet do not contact each other. This will innately provide for a gap 40 (partially illustrated in FIG. 1) to be located between the ends of the shaft member 38.

Slideably secured to one end of the shaft member 38 is a cover device 42. This cover device 42 includes a first end 44*a* that is slideably and permanently attached, via conventional means, to an end of the shaft and a second end 44*b*, having a substantially hollow interior. This second end 44*b* of the hollow interior receives the opposite end of the shaft.

To utilize this holding apparatus 16, the user slides back the cover device 42. This will provide for the gap to be exposed (as seen in FIG. 1). The gap will enable the desired ring gauge of a particular set to be removed and/or replaced easily and quickly. This cover device and the gap constitute the exit/entrance element 32.

It is noted that the attaching device 14 is of a size that is larger in diameter to the cover device 42. This will inherently allow for the gauges of each set to slide freely over the cover device 42 so as to enable easy accessible of each and ever gauge of each set.

To enhance the cover device, a spring (not illustrated) can be internally located between the ends of the cover device 42. The first end of the spring will be attached to the end of the shaft. Accordingly, this will provide for a spring-loaded cover and thus will render a compressed spring to provide an open position and an extended spring to provide a closed position.

Accordingly to use the cover device, for removing or replacing a ring of a particular set of gauges, the user slides the cover device so as to expose the gap. Once exposed, the particular gauge is removed and/or replace. Covering the gap will prevent removal of any and all of the components of the apparatus of the present invention.

The final product is an apparatus that offers options to the consumer for rings that are too larger around the finger. These options are grouped in a single apparatus so as to provide assessable and offer the ability for the consumer to physically contact and manipulate each and every option which is available. In addition, the consumer will be aware of the costs and hence can make an educated decision base on the physical feel as well as the economical costs so as to provide for a final product which is enjoyable and comfortable to wear. The benefits are immeasurable and to visibly and physically see and wear each type of option, for each ring size, will give the consumer an accurate feel for the product. To further assist, the ring guards can be fabricated from any durable material, such as gold, as is typical with conventional rings. Other material, such as any metal, silver, plastic, or the like can be used, which will reduce the overall costs of the final product, yet without sacrificing its utility.

While the invention has been particularly shown and described with reference to an embodiment thereof, it will be understood by those skilled in the art that various changes in form and detail may be made without departing from the spirit and scope of the invention.

I claim:

1. A demonstration system for sizing rings comprising:
   a holding apparatus;
   at least two sets of gauges, each of said at least two sets of gauges including a plurality of rings in various sizes and said rings increase in incremental sizes, wherein said plurality of rings is identical for each set of gauges;
   an attaching device is secured to each ring of each set of gauges;
      said attaching devices being removably and slideably secured to said holding apparatus;
      each set being secured to said holding apparatus via said attaching device;
   a ring guard-type item being secured to each ring of at least one of said sets of gauges;
      the rings of at least one of said sets of gauges as free from ring guard-type items so as to provide at least one of said sets of gauges being a standard gauge set; and
   said holding apparatus further includes an exit/entrance element for enabling removal and insertion of a particular ring.

2. A demonstration set as in claim 1 wherein said holding apparatus further includes an exit/entrance element for enabling removal and insertion of a particular ring.

3. A demonstration system as in claim 1 wherein said attaching device of each ring of said at least two set of gauges can pass over and around said exit/entrance element.

4. A demonstration system as in claim 3 wherein said attaching device is a hoop.

5. A demonstration system as in claim 3 wherein said holding apparatus is an elongated shaft substantially shaped as a rectangular member, said shaft includes a first end and a second end, said first end faces said second end, a gap is located between said first end and said second end, a cover device slideably covers and exposes said gap, said cover and said gap constitutes said exit/entrance element.

6. A demonstration system as in claim 1 wherein a second ring guard-type item being secured to each ring of a second set of said at least two sets of gauges, said second ring guard-type item being structurally different than said ring guard-type item.

7. A demonstration system as in claim 6 wherein said ring guard-type item is selected from the group consisting of spring loaded clips, internal gripping fingers, adjustable sliding ring shanks, pivotal type ring guards, and solid nubs and said second said ring guard-type item is selected from the group consisting of spring loaded clips, internal gripping fingers, adjustable sliding ring shanks, pivotal type ring guards, and solid nubs.

8. A demonstration system as in claim 1 wherein said ring guard-type item is selected from the group consisting of spring loaded clips, internal gripping fingers, adjustable sliding ring shanks, pivotal type ring guards, and solid nubs.

9. A demonstration system as in claim 1 wherein each rings of said set of gauges is fabricated from gold.

10. A demonstration system for sizing rings comprising:
    a holding apparatus;
    at least two sets of gauges, each of said at least two sets of gauges including a plurality of rings in various sizes and said rings increase in incremental sizes, wherein said plurality of rings is identical for each set of gauges;
       said attaching devices being removably and slideably secured to said holding apparatus;
    a first ring guard-type item being secured to each ring of a first set of said at least three sets of gauges;
    a second ring guard-type item being secured to each ring of a second set of said at least three sets of gauges;
       said first ring guard-type item of said first set of said at least three sets of gauges being structurally different from said second ring guard-type item of said second set of said at least three sets of gauges; and
    at least one of said sets of gauges being free from ring guard-type items so as to provide at least one of said sets of gauges as a standard gauge set.

11. A demonstration system as in claim 10 wherein said holding apparatus further includes an exit/entrance element for enabling removal and insertion of a particular ring.

12. A demonstration system as in claim 11 wherein said attaching device of said at least three sets of gauges can pass over and around said exit/entrance element.

13. A demonstration system as in claim 12 wherein said attaching device is a hoop.

14. A demonstration system as in claim 13 wherein said holding apparatus is an elongated shaft substantially shaped as a rectangular member, said shaft includes a first end and a second end, said first end faces said second end, a gap is located between said first end and said second end, a cover device slideably covers and exposes said gap, said cover and said gap constitutes said exit/entrance element.

15. A demonstration system as in claim 12 wherein said exit/entrance element is spring loaded.

16. A demonstration system as in claim 10 wherein said first ring guard-type item is selected from the group consisting of spring loaded clips, internal gripping fingers, adjustable sliding ring shanks, pivotal type ring guards, and solid nubs and said second said ring guard-type item is selected from the group consisting of spring loaded clips, internal gripping fingers, adjustable sliding ring shanks, pivotal type ring guards, and solid nubs.

17. A demonstration set as in claim 10 wherein each rings of said set of gauges is fabricated from gold.

* * * * *